(12) United States Patent
Rottmayer et al.

(10) Patent No.: US 6,201,673 B1
(45) Date of Patent: Mar. 13, 2001

(54) SYSTEM FOR BIASING A SYNTHETIC FREE LAYER IN A MAGNETORESISTANCE SENSOR

(75) Inventors: Robert E. Rottmayer; Jain-Gang Zhu, both of Pittsburgh, PA (US); Kenneth Everett Knapp, Livermore; Yiming Huai, Pleasanton, both of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/285,318

(22) Filed: Apr. 2, 1999

(51) Int. Cl.[7] ............................. G11B 5/127; G11B 5/33
(52) U.S. Cl. ........................................... 360/324.12
(58) Field of Search ............................ 360/324.1, 324.12

(56) References Cited

U.S. PATENT DOCUMENTS

| | | |
|---|---|---|
| 4,663,685 | 5/1987 | Tsang . |
| 5,304,975 | 4/1994 | Saito et al. . |
| 5,329,413 | 7/1994 | Kondoh et al. . |
| 5,408,377 | 4/1995 | Gurney et al. . |
| 5,465,185 | 11/1995 | Heim et al. . |
| 5,568,115 | 10/1996 | Kano et al. . |
| 5,583,725 | 12/1996 | Coffey et al. . |
| 5,608,593 * | 3/1997 | Kim et al. .................... 360/324.12 |
| 5,666,248 | 9/1997 | Gill . |
| 5,686,838 | 11/1997 | van den Berg . |
| 5,696,654 | 12/1997 | Gill et al. . |
| 5,701,223 | 12/1997 | Fontana, Jr. et al. . |
| 5,703,738 | 12/1997 | Kim et al. . |
| 5,725,963 | 3/1998 | Iwasaki et al. . |
| 5,726,838 | 3/1998 | Soeya et al. . |
| 5,729,410 | 3/1998 | Fontana, Jr. et al. . |
| 5,739,987 | 4/1998 | Yuan et al. . |
| 5,748,413 | 5/1998 | Lederman et al. . |
| 5,966,012 * | 10/1999 | Parkin ............................... 324/252 |

* cited by examiner

Primary Examiner—Hoa T. Nguyen
Assistant Examiner—Julie Anne Watko
(74) Attorney, Agent, or Firm—Sawyer Law Group LLP (57) ABSTRACT

A system and method for providing a magnetoresistive head is disclosed. The method and system include providing a spin valve including a synthetic free layer. The synthetic free layer includes a ferromagnetic layer. The method and system also include providing an antiferromagnetic biasing layer exchange coupled to a first portion of the ferromagnetic layer. The antiferromagnetic biasing layer magnetically biases the synthetic free layer to ensure the single domain structure and reduce noise.

8 Claims, 8 Drawing Sheets

SYSTEM FOR BIASING A SYNTHETIC FREE LAYER IN A MAGNETORESISTANCE SENSOR

FIELD OF THE INVENTION

The present invention relates to magnetoresistive sensors and more particularly to a method and system for stabilizing a synthetic free layer of a spin valve that allows the spin valve to be used at as a sensor in a magnetoresistive head at higher densities.

BACKGROUND OF THE INVENTION

Currently, spin valves are typically used for the magnetoresistive (MR) element in MR read heads. A spin valve includes two magnetic layers, a free layer and a pinned layer. A spin valve also includes a spacer layer and a conventional antiferromagnetic (AFM) layer. The spin valve may also include a capping layer. The free layer and pinned layer are separated by the spacer layer. The magnetic moment of the pinned layer is typically fixed by exchange coupling to the conventional AFM layer. The free layer is typically biased to ensure that the free layer has a single domain structure. The free layer is typically biased using either permanent magnets or antiferromagnets. In order to read data stored on a recording media, the MR head is placed in proximity to the recording media. The magnetic moment of the free layer may change based on the magnetic moment of the bit currently being read. As a result, the resistance of the spin valve changes and the magnetic moment of the bit can be determined.

The current trend in recording technology is toward higher areal densities. As densities increase, the size of each bit is reduced. Therefore, the magnetic moment of each bit diminishes. As the magnetic moment of each bit decreases, the ability of each bit to affect magnetic moment the free layer is reduced. This is because the magnetic moment of the free layer becomes very large compared to the magnetic moment of a bit. Because the bit has less effect on the free layer, the spin valve becomes unable to read efficiently at higher density recording media.

In order to increase the ability of the free layer to read at higher densities, the magnetic moment of the free layer is reduced. If the magnetic moment of the free layer is reduced by decreasing the thickness of the free layer, an increased portion of the resistance of the spin valve is due to scattering at the surfaces of the free layer. This is particularly true when the free layer has a thickness that is less than the mean free path of electrons in the free layer, which is approximately fifty Angstroms. This scattering at the surfaces of the free layer is spin independent and, therefore, reduces the portion of the resistance of the spin valve that is due to magnetoresistance. Decreasing the thickness of the free layer thus reduces the magnetoresistance of the spin valve, which is undesirable.

To avoid this reduction in magnetoresistance, the magnetic moment of the free layer can be reduced by providing a ferrimagnetic synthetic free layer. The synthetic free layer includes two ferromagnetic layers separated by a spacer layer. The distance between the ferromagnetic layers is selected so that the ferromagnetic layers are strongly antiferromagnetically coupled. Furthermore, one ferromagnetic layer has a greater magnetic moment than the other ferromagnetic layer. Thus, although the ferromagnetic layers are antiferromagnetically coupled, the combination has a small magnetic moment. This allows the spin valve having the synthetic free layer to be used in reading higher densities. Furthermore, the thickness of the synthetic free layer can be set so to be longer than the mean free path of elections in the layer. Thus, the symmetric free layer maintains a physical thickness greater than fifty Angstroms, while decreasing the effective magnetic thickness. Scattering at the surfaces of the synthetic free layer does not unduly reduce the magnetoresistance of the spin valve. Thus, the spin valve having the synthetic free layer can be used in reading higher areal density recording media.

Although the spin valve having a synthetic free layer can be used in high density recording applications, the magnetic moment of the synthetic free layer may be unstable. It is desirable for each of the ferromagnetic layers of the synthetic free layer to have a single domain structure. If the ferromagnetic layers in the synthetic free layer have multiple domains, then the walls of the domains will move when the spin valve is used to read data. Domain wall motion is a source of non-repeatable noise. Noise due to domain wall motion can be substantially eliminated if the magnetic layers in the synthetic free layer have a single domain structure.

Typically, permanent magnets are used to magnetically bias a synthetic free layer of a spin valve. However, if permanent magnets are used to bias the synthetic free layer, then the permanent magnets are magnetostatically coupled to both of the ferromagnetic layers in the synthetic free layer. The ferromagnetic layers have opposite directions of magnetization. The ferromagnetic layer having a direction of magnetization that is the same as the permanent magnet may have a single domain structure. However, the permanent magnet may cause domains to be formed in the other ferromagnetic layer. Consequently, permanent magnets do not ensure that both ferromagnetic layers of the synthetic free layer have a single domain structure. Therefore, noise due to domain wall motion is not reduced.

Accordingly, what is needed is a system and method for biasing the synthetic free layer. The present invention addresses such a need.

SUMMARY OF THE INVENTION

The present invention provides a method and system for providing a magnetoresistive head. The method and system comprise providing a spin valve including a synthetic free layer. The synthetic free layer includes two ferromagnetic layers separated by a nonmagnetic layer. The method and system also comprise providing an antiferromagnetic biasing layer exchange coupled to the first portion of the ferromagnetic layer. The antiferromagnetic biasing layer magnetically biases the synthetic free layer.

According to the system and method disclosed herein, the present invention magnetically biases the synthetic free layer of the spin valve, allowing the synthetic free layer to have a single domain structure and reducing noise due to domain wall motion.

DETAILED DESCRIPTION OF THE INVENTION

The present invention relates to an improvement in magnetoresistive heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
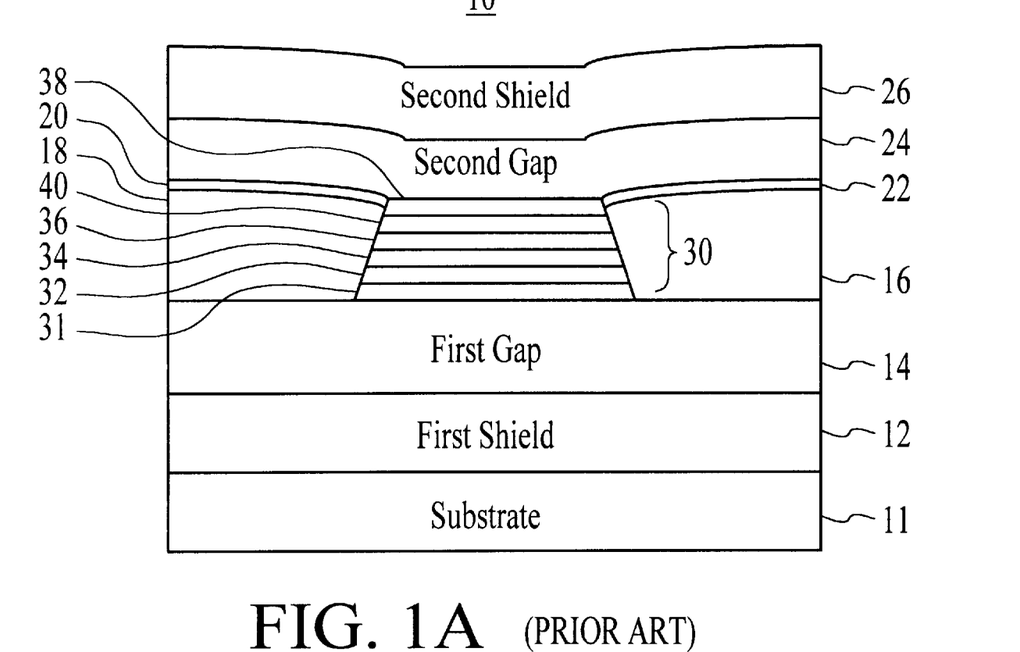
FIG. 1A is a block diagram of a conventional magnetoresistive head.

FIG. 1A is a block diagram of a conventional magnetoresistive (MR) head 10 which may be used to read high density recording media. The conventional head 10 includes a first shield 12 formed on a substrate 11, a first gap 14, and a spin valve 30. The spin valve 30 includes an antiferromagnetic layer 32, a pinned layer 34, a spacer layer 36, and a synthetic free layer 40. An optional capping layer 38 is provided on the spin valve 30. The spin valve also includes an optional seed layer 31 for nucleating the antiferromagnetic layer 32. Typically, the capping layer 38 is made of tantalum. Note that in some conventional MR heads (not shown), a synthetic antiferromagnetic layer (not shown) may replace the pinned layer 34 and the antiferromagnetic layer 32. The conventional MR head 10 also includes permanent magnets 16 and 18, leads 20 and 22, a second gap 24 and a second shield 26. The permanent magnets 16 and 18 are used to magnetically bias the synthetic free layer 40. The leads 20 and 22 allow current to be driven through the spin valve 30.

Figure 1B:
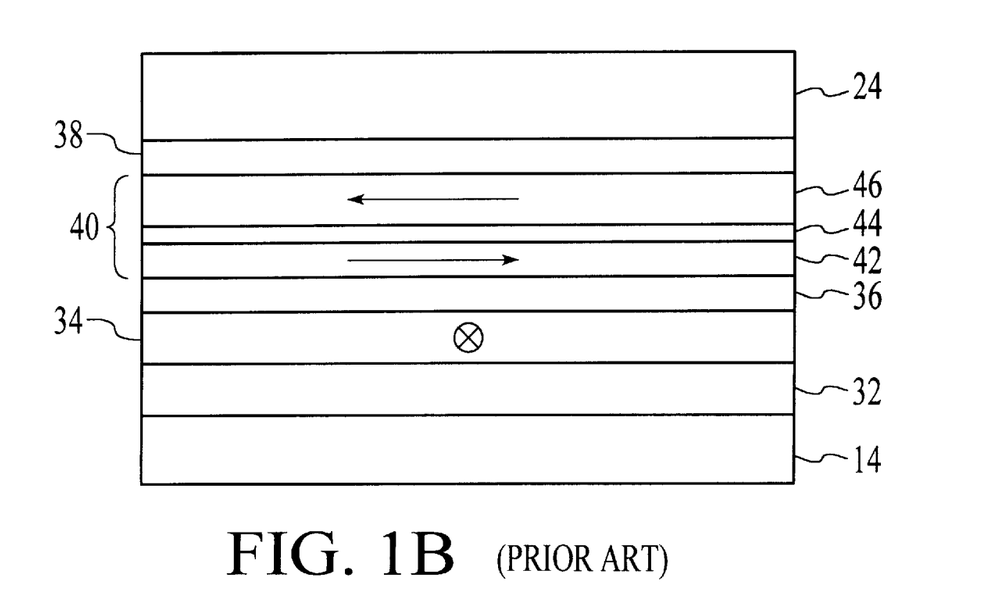
FIG. 1B is a more detailed diagram of the conventional magnetoresistive sensor in the magnetoresistive head.

FIG. 1B is a more detailed block diagram of a portion of the conventional MR head 10 showing a portion of the spin valve 30, a portion of the first gap 14, and a portion of the second gap 24. The individual layers 42, 44, and 46 of the synthetic free layer 40 are also shown. The synthetic free layer 40 includes a bottom ferromagnetic layer 42 and a top ferromagnetic layer 46 separated by a spacer layer 44. The magnetic moments of the pinned layer 34, the bottom ferromagnetic layer 42, and the top ferromagnetic layer 46 are depicted in FIG. 1B. The magnetic moment of the top ferromagnetic layer 46 of the synthetic free layer 40 is larger than that of the bottom ferromagnetic layer 42. Furthermore, the separation between the top ferromagnetic layer 46 and the bottom ferromagnetic layer 42 is chosen so that these layers 42 and 46 are strongly antiferromagnetically coupled. One ferromagnetic layer 46 has a larger magnetic moment than the other ferromagnetic layer 42. In one embodiment, this imbalance in magnetic moments can be achieved by using different thicknesses of magnetic material for the top ferromagnetic layer 46 and the bottom ferromagnetic layer 42. Because of the imbalance in magnetic moments, the synthetic free layer 40 has a net magnetic moment. This magnetic moment is less than the moment of at least one of the top ferromagnetic layer 46 and the bottom ferromagnetic layer 42. Thus, the synthetic free layer 40 is ferrimagnetic.

Because the moment of the synthetic free layer 40 is reduced, the conventional MR head 10 can be used in reading higher density recording media. The smaller bits in the high density recording media have a smaller magnetic moment. Because the magnetic moment of the synthetic free layer 40 is reduced, the smaller bits may still be able to affect the magnetic moment of the synthetic free layer. Consequently, the conventional MR head 10 including the spin valve 30 can be used to read at higher densities and lower bit dimensions.

Although the conventional MR head 10 and shown in FIGS. 1A and 1B function, those with ordinary skill in the art will realize that the conventional MR head 10 may be subject to noise due to domain wall motion. If the synthetic free layer 40 contains domains, then the magnetic moment of the bits in the recording media may cause the walls of the domains to move when the conventional MR head 10 is used to read the recording media Domain wall motion causes non-repeatable noise. It is desirable to magnetically bias the synthetic free layer 40 in order to ensure that each of the ferromagnetic layers 42 and 46 of the synthetic free layer 40 has a single domain structure and, therefore, allows for reduced noise due to domain wall motion.

Figure 2:
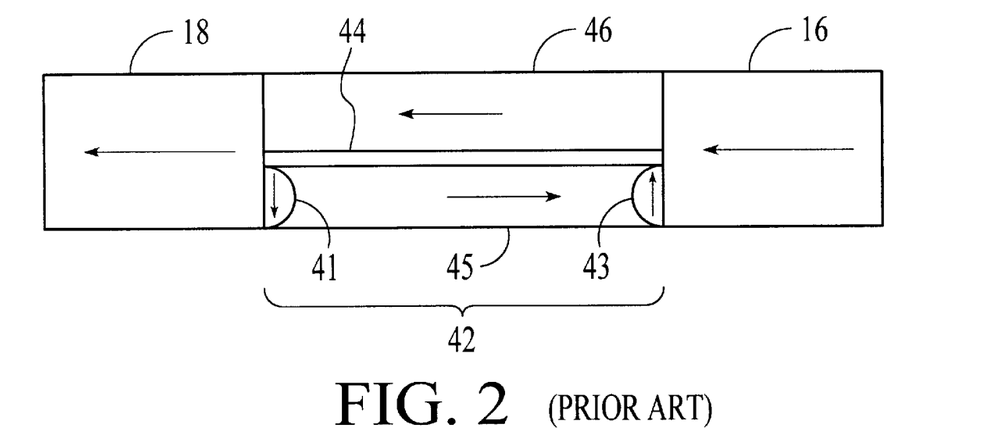
FIG. 2 is a more detailed block diagram depicting the magnetization of the synthetic free layer of the conventional magnetoresistive head.

The conventional MR head 10 uses the hard magnets 16 and 18 to magnetically bias the synthetic free layer 40. The hard magnets 16 and 18 are magnetostatically coupled to the magnetic layers 42 and 46 of the synthetic free layer 40. FIG. 2 depicts the magnetic moments of the permanent magnets 16 and 18, as well as the magnetic moment of the bottom ferromagnetic layer 42 and the top ferromagnetic layer 46. The magnetic moment of the permanent magnets 16 and 18, the magnetic moment of the top ferromagnetic layer 46 and, therefore, the net magnetic moment of the synthetic free layer are in the same direction. However, the bottom ferromagnetic layer 42 is antiferromagnetically coupled with the top ferromagnetic layer 46. Thus, the direction of magnetization of the bottom ferromagnetic layer 42 is opposite to that of the permanent magnets 16 and 18. This difference in the directions of magnetization and the magnetostatic coupling between the bottom ferromagnetic layer 42 and the hard magnets 18 and 16 causes domains 41, 43, and 45 to be formed in the bottom ferromagnetic layer 42. Instead of ensuring that the ferromagnetic layers 42 and 46 of synthetic free layer 40 have a single domain structure, the hard magnets 16 and 18 cause at least one ferromagnetic layer 42 to have multiple domains 41, 43, and 45. Consequently, the conventional MR head 10 is subject to noise caused by domain wall motion.

The present invention provides a method and system for providing a magnetoresistive head. The method and system comprise providing a spin valve including a synthetic free layer. The synthetic free layer includes two ferromagnetic layers separated by a spacer layer. The method and system also comprise providing an antiferromagnetic biasing layer above a first portion of the ferromagnetic layer. The antiferromagnetic biasing layer is exchange coupled to the first portion of the ferromagnetic layer. The antiferromagnetic biasing layer magnetically biases the synthetic free layer.

The present invention will be described in terms of a particular spin valve and in terms of particular materials. However, one of ordinary skill in the art will readily recognize that this method and system will operate effectively for other types of materials used in another magnetoresistive sensor. Furthermore, the present invention is described in the context of a read head depicted alone. However, one of ordinary skill in the art will readily realize that the method and system can be used in a read head incorporated into a in a merged head including a read head and a write head that may be used in a hard disk drive. The processing of the magnetoresistive head in accordance with present invention will also be described. However, one of ordinary skill in the art will readily realize that steps have been omitted for clarity.

Figure 3A:
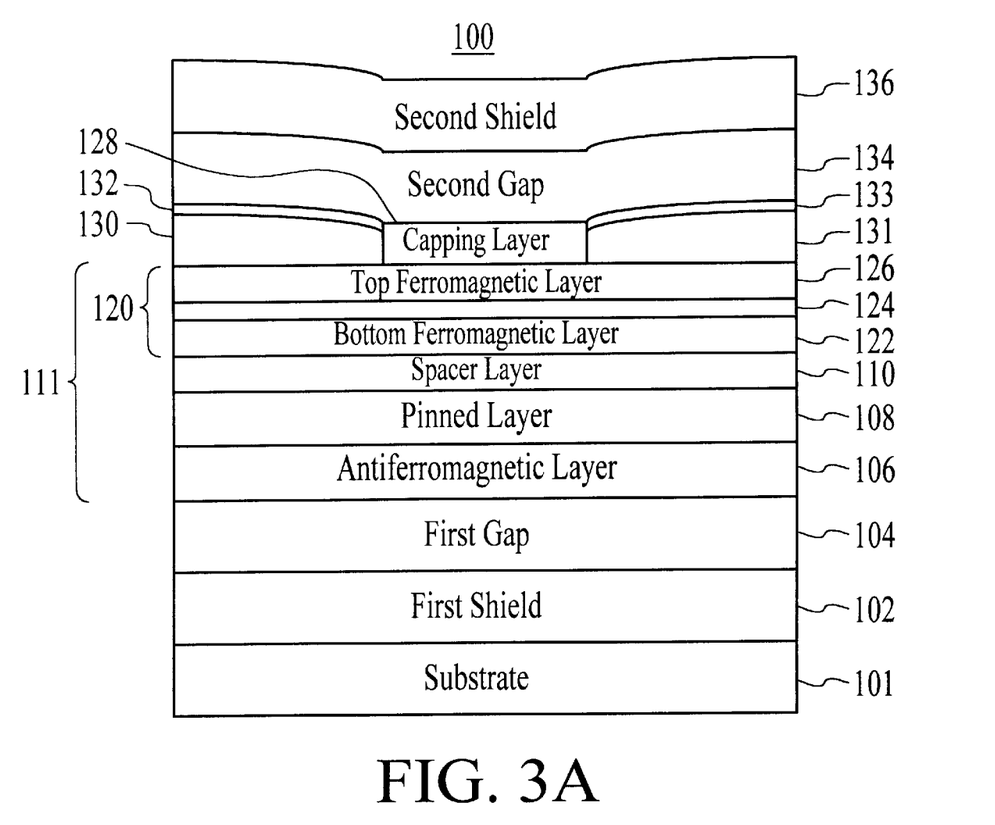
FIG. 3A is a block diagram of one embodiment of a magnetoresistive head in accordance with the present invention.
Figure 4:
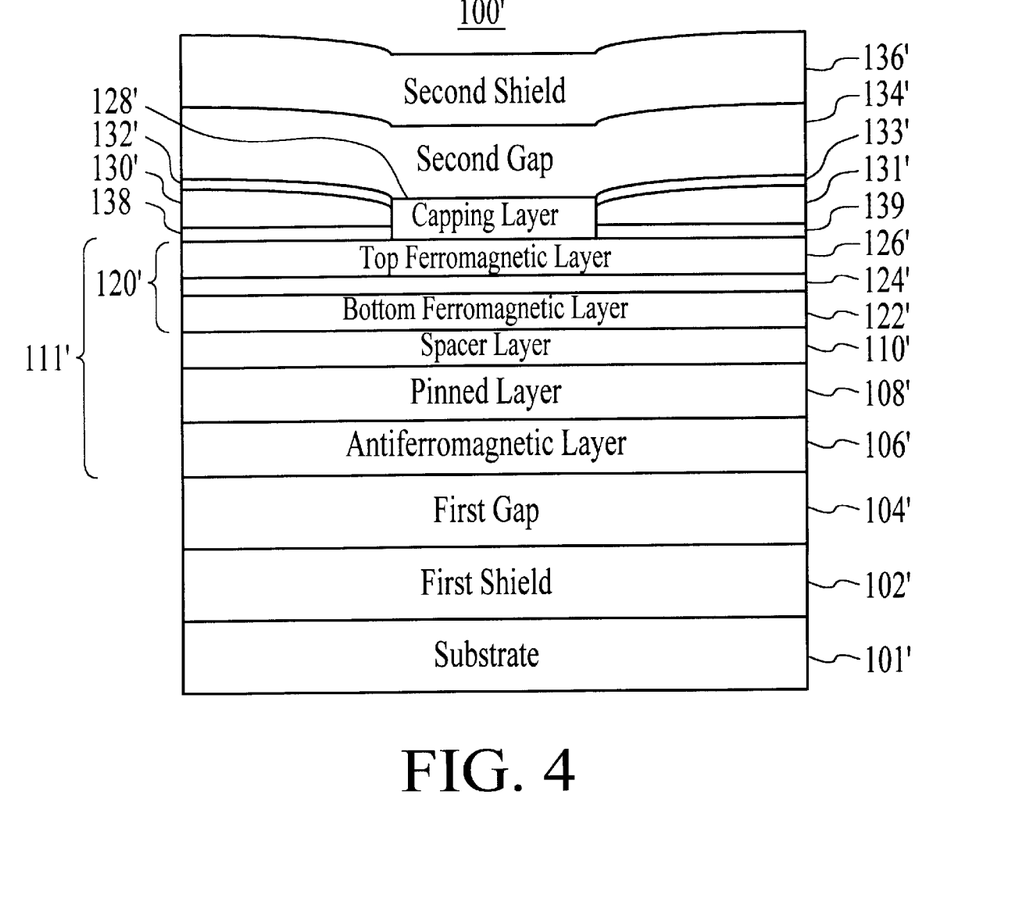
FIG. 4 is a block diagram of another embodiment of a magnetoresistive head in accordance with the present invention.
Figure 5:
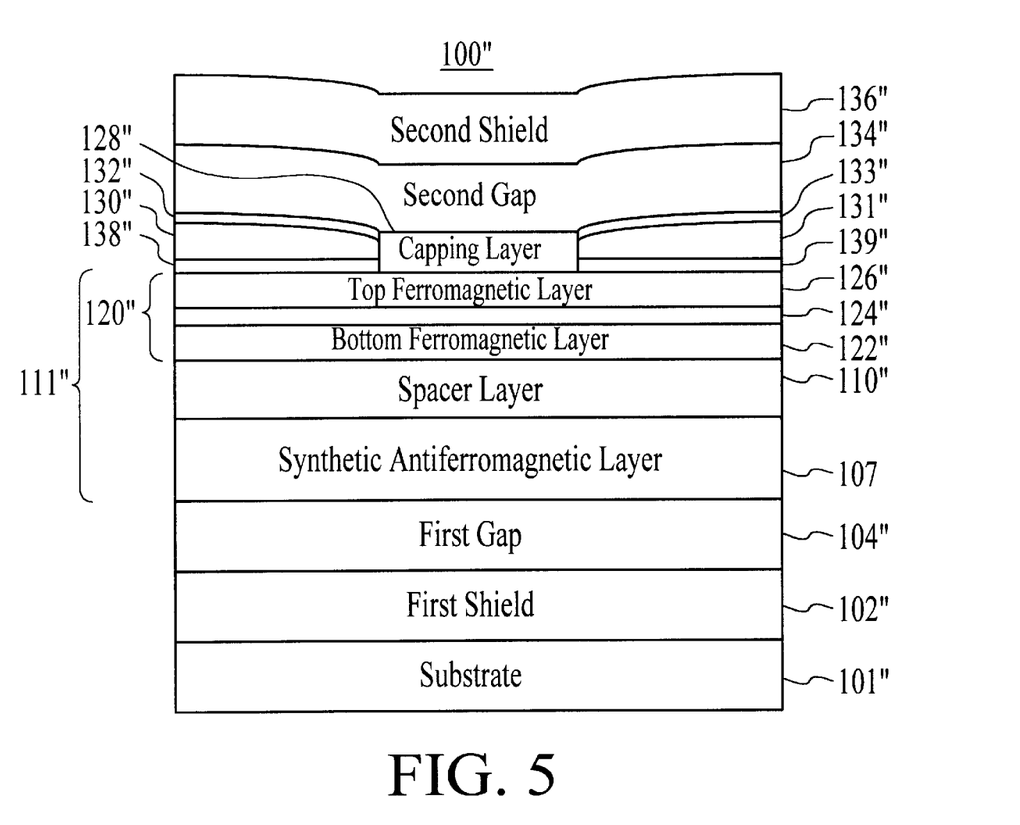
FIG. 5 is a block diagram of a third embodiment of a magnetoresistive head in accordance with the present invention.

To more particularly illustrate the method and system in accordance with the present invention, refer now to FIGS. 3A, 4, and 5 depicting block diagrams of embodiments 100, 100' and 100", respectively, of MR heads in accordance with the present invention. Referring to FIG. 3A, the MR head 100 in accordance with the present invention includes a first shield 102 formed on a substrate 101, a first gap 104, a second gap 134, and a second shield 136. The MR head 100 includes a spin valve 111 including an antiferromagnetic layer 106, a pinned layer 108, a spacer layer 110, and a synthetic free layer 120. An optional capping layer 128 is provided on the spin valve 111. The synthetic free layer 120 includes two ferromagnetic layers 122 and 126 separated by a nonmagnetic layer 124. The ferromagnetic layers 122 and 126 are strongly antiferromagnetically coupled. The magnetic moment of one of the ferromagnetic layers 122 or 126 is lower than the other ferromagnetic layer 126 or 122. In one embodiment, this is achieved by making one of the ferromagnetic layers 122 or 126 thinner than the other. Thus, the synthetic free layer 120 has a small net magnetic moment. In the MR head 100 shown, the top ferromagnetic layer 126 has a higher magnetic moment than the bottom ferromagnetic layer 122. Through fabrication of the synthetic free layer 120, the MR head 100 can be formed using conventional techniques.

The MR head 100 also includes antiferromagnetic biasing layers 130 and 131 as well as leads 132 and 134. The leads 132 and 134 carry current to and from the spin valve 111. The antiferromagnetic biasing layers 130 and 131 are exchange coupled to the top ferromagnetic layer 126 of the synthetic free layer 120. Thus, the antiferromagnetic biasing layers 130 and 131 may be relatively strongly coupled to the top ferromagnetic layer 126. The antiferromagnetic biasing layers 130 and 131 are very weakly or not magnetically coupled to the other ferromagnetic layer 122. Because the biasing layers 130 and 131 are antiferromagnetic, there is substantially no magnetostatic coupling between the biasing layers 130 and 131 and the bottom ferromagnetic layer 122. Thus, the antiferromagnetic biasing layers 130 and 131 are exchange coupled to the top ferromagnetic layer 126, but essentially not magnetically coupled to the bottom ferromagnetic layer 122.

Because the antiferromagnetic biasing layers 130 and 131 are exchange coupled to the top ferromagnetic layer 126, the antiferromagnetic biasing layers 130 and 131 can magnetically bias the top ferromagnetic layer 126. Consequently, the antiferromagnetic biasing layers 130 and 131 can ensure that the ferromagnetic layer to which the layers 130 and 131 are coupled has a single domain structure. For example, in the MR head 100, the antiferromagnetic biasing layers 130 and 131 are exchange coupled to the top ferromagnetic layer 126 and bias the top ferromagnetic layer 126. Thus, the antiferromagnetic biasing layers 130 and 131 ensure that the top ferromagnetic layer 126 has a single domain structure.

The top ferromagnetic layer 126 is strongly antiferromagnetically coupled to the bottom layer 122. Thus, the top ferromagnetic layer 126 can aid in determining the domain structure of the bottom ferromagnetic layer 126. When the top ferromagnetic layer 126 is biased by the antiferromagnetic biasing layers 130 and 131, the top ferromagnetic layer 126 biases the bottom ferromagnetic layer 122. Consequently, each of the ferromagnetic layers 122 and 126 has a single domain structure.

Figure 3B:
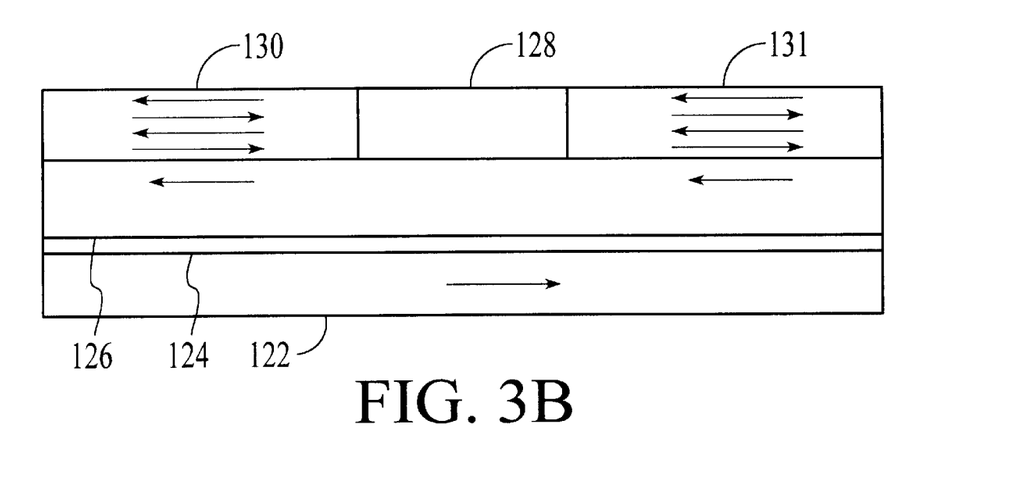
FIG. 3B is a more detailed block diagram depicting the magnetization of the synthetic free layer and antiferromagnetic biasing layers of one embodiment of a magnetoresistive head in accordance with the present invention.

The magnetic structure of the synthetic free layer 120 is illustrated in FIG. 3B. FIG. 3B depicts the top and bottom ferromagnetic layers 126 and 122, respectively, and the antiferromagnetic biasing layers 130 and 131. As depicted in FIG. 3B, the layers 130 and 131 are antiferromagnetic and exchange coupled to the top ferromagnetic layer 126. Consequently, the top ferromagnetic layer 126 has a single domain structure. The top ferromagnetic layer 126 is strongly antiferromagnetically coupled with the bottom ferromagnetic layer 122. Thus, the bottom ferromagnetic layer 122 also has a single domain structure. Furthermore, because a synthetic free layer 120 is used, the magnetic moment of the synthetic free layer 120 can be kept low without reducing the physical thickness of the synthetic free layer. Consequently, higher density recording media storing bits having a lower magnetic moment can be read while noise due to domain wall motion is reduced or eliminated.

FIGS. 4 and 5 depict embodiments 100' and 100", respectively, of MR heads in accordance with the present invention. Many of the elements of the MR heads 100' and 100" are substantially the same as the MR head 100 depicted in FIG. 3A. Consequently, these elements are numbered similarly to the elements in the MR head 100. Referring to FIG. 4, in addition to the elements included in the MR head 100, the MR head 100' includes ferromagnetic layers 138 and 139 disposed between the top ferromagnetic layer 126' and the antiferromagnetic biasing layers 130' and 131'. The ferromagnetic layers 138 and 139 facilitate the exchange coupling between the antiferromagnetic biasing layers 130' and 131', respectively, and the top ferromagnetic layer 126'.

Because the antiferromagnetic biasing layers 130' and 131' are exchange coupled to the top ferromagnetic layer 126' through the additional ferromagnetic layers 138 and 139, respectively, the antiferromagnetic biasing layers 130' and 131' can magnetically bias the top ferromagnetic layer 126'. Consequently, the antiferromagnetic biasing layers 130' and 131' can ensure that the top ferromagnetic layer 126' has a single domain structure. Thus, the antiferromagnetic biasing layers 130' and 131' ensure that the top ferromagnetic layer 126' has a single domain structure.

The top ferromagnetic layer 126' is strongly antiferromagnetically coupled to the to bottom layer 122'. Thus, the top ferromagnetic layer 126' can aid in determining the domain structure of the bottom ferromagnetic layer 126'. When the top ferromagnetic layer 126' is biased by the antiferromagnetic biasing layers 130' and 131', the top ferromagnetic layer 126' biases the bottom ferromagnetic layer 122'. Consequently, each of the ferromagnetic layers 122' and 126' has a single domain structure. Thus, the MR head 100' has reduced noise due to domain wall motion and is capable of reading higher density recording media due to the reduced magnetic moment of the synthetic free layer 120'.

Referring to FIG. 5, the MR head 100" is substantially the same as the MR head 100'. However, the MR head 100" includes a synthetic antiferromagnetic layer 107 in lieu of the antiferromagnetic layer 106' and the pinned layer 108'. The MR head 100 depicted in FIG. 3A could also include a synthetic antiferromagnetic layer (not shown) instead of the pinned layer 108 and antiferromagnetic layer 106. As discussed with respect to the MR heads 100 and 100', the antiferromagnetic biasing layers 130" and 131" depicted in FIG. 5 are exchange coupled to the top ferromagnetic layer 126". Thus, the antiferromagnetic biasing layers 130" and 131" bias the top ferromagnetic layer 126" to ensure that the top ferromagnetic layer 126" has a single domain structure. The top ferromagnetic layer 126" is strongly antiferromagnetically coupled to the bottom layer 122". Thus, the top ferromagnetic layer 126" biases the bottom ferromagnetic layer 122", ensuring that the bottom ferromagnetic layer 122' has a single domain structure. Consequently, each of the ferromagnetic layers 122' and 126' has a single domain structure. Consequently, each of the ferromagnetic layers 122' and 126' has a single domain structure. Thus, the MR head 100" has reduced noise due to domain wall motion and is capable of reading higher density recording media due to the reduced magnetic moment of the synthetic free layer 120".

Figure 6:
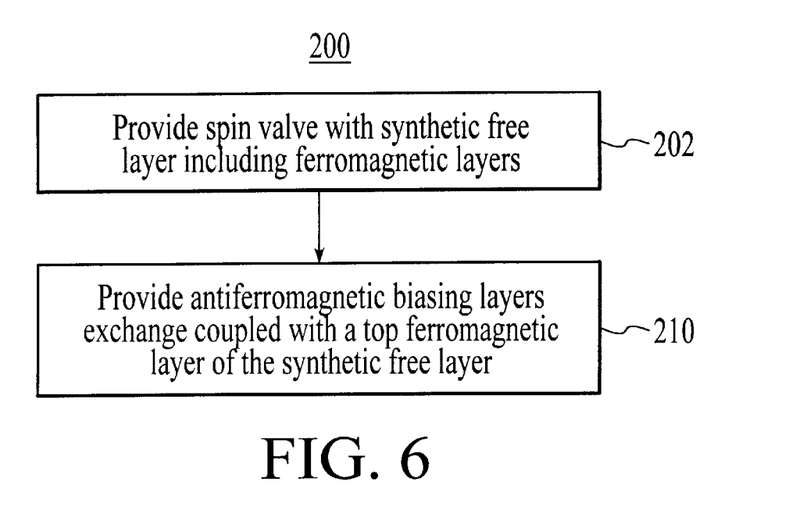
FIG. 6 is a high-level flow chart depicting a method for biasing a synthetic free layer in accordance with the present invention.

FIG. 6 depicts a method 200 in accordance with the present invention for providing a MR head 100, 100', or 100" having reduced noise due to domain wall motion. A spin valve 111, 111' or 111" including a synthetic free layer 120, 120', or 120" is provided, via step 202. The synthetic free layer 120, 120', or 120" includes a ferromagnetic layer 126, 126', or 126" which will be biased using exchange coupling. Antiferromagnetic biasing layers 130 and 131, 130' and 131', or 130" and 131" are provided, via step 210. The antiferromagnetic biasing layers 130 and 131, 130' and 131', or 130" and 131" are provided such that the antiferromagnetic biasing layers 130 and 131, 130' and 131', or 130" and 131" are exchange coupled with the ferromagnetic layer 126, 126', or 126" in the synthetic free layer 120, 120', or 120". The method 200 is described in the context of providing the spin valve 111, 111', or 111" first. However, in an alternate embodiment, the antiferromagnetic biasing layers 131 and 131, 130', and 131', or 130" and 131" may be provided first. The spin valve 111, 111', or 111" would then be provided such that the synthetic free layer 120, 120', or 120" is exchange coupled with the antiferromagnetic biasing layers 130 and 131, 130' and 131', or 130" and 131", respectively.

Figure 7A:
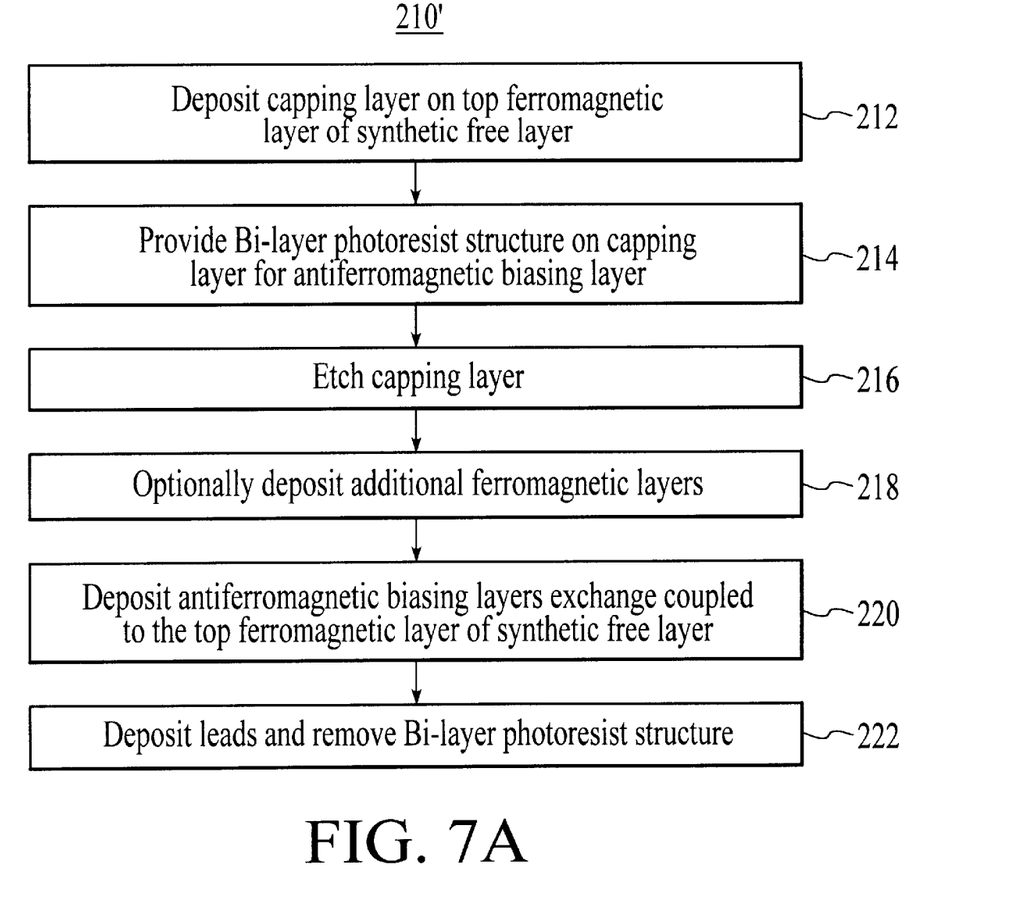
FIG. 7A is a more detailed flow chart of a first embodiment of a method for biasing a synthetic free layer in accordance with the present invention.

FIG. 7A depicts a more detailed flow chart of one embodiment 210' of the step 210, providing antiferromagnetic biasing layers 130 and 131, 130' and 131', or 130" and 131" in accordance with the present invention. The method 210' preferably commences after the synthetic spin valve 111, 111', or 111" has been provided in a conventional manner. The capping layer 128, 128' or 128" is optionally provided, via step 212. In one embodiment, the capping layer is an insulator such as Ta/AlN. In such an embodiment, the capping layer 128, 128', or 128" could include another insulator such as alumina or tetrahedral amorphous carbon. Because the capping layer 128, 128', or 128" is provided soon after formation of the top ferromagnetic layer 126, 126', or 126", interdiffusion into the top ferromagnetic layer 126, 126', or 126" during subsequent processing is reduced. Providing the capping layer 128, 128', or 128" soon after formation of the top ferromagnetic layer 126, 126', or 126" also allows for better control of the physical track width of the MR head 100, 100', or 100" being formed. The physical track width is related to the width of the capping layer 128, 128', or 128".

Figure 7B:
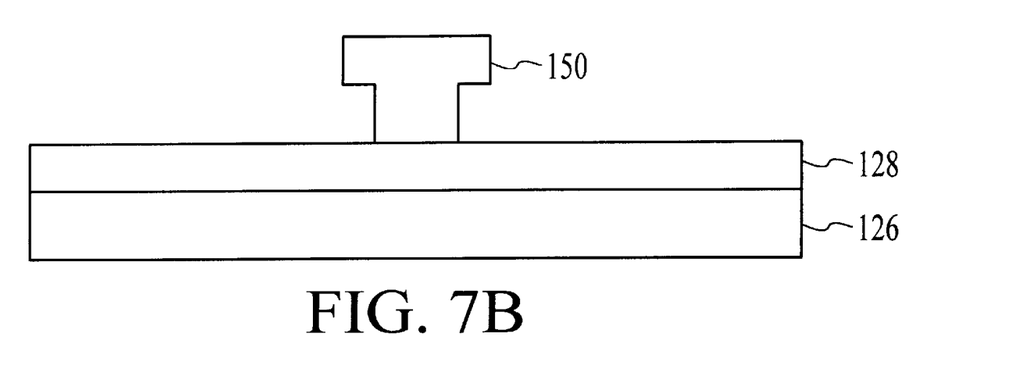
FIG. 7B depicts the magnetoresistive head during fabrication using the first embodiment of a method in accordance with the present invention.

A bi-layer photoresist structure is then provided on the capping layer, 128' or 128" or on the top ferromagnetic layer 126, 126', or 126". The bi-layer photoresist structure 150 provided in step 214 is depicted in FIG. 7B. The bi-layer photoresist structure 150 allows for the desired profile to be achieved. Referring back to FIG. 7A, the exposed portion of the capping layer 128, 128', or 128" is etched, via step 216. The etching preferably stops just after the top ferromagnetic layer 126, 126', or 126" is exposed. In a preferred embodiment, step 216 includes ion milling the capping layer 128, 128', or 128" The additional ferromagnetic layers 138 and 139, or 138" and 139" may be provided, via step 218. In a preferred embodiment, the additional ferromagnetic layers 138 and 139 or 138" and 139" are between ten and thirty Angstroms of NiFe. The antiferromagnetic biasing layers 130 and 131, 130' and 131', or 130" and 131" are then deposited, via step 220. The antiferromagnetic biasing layer 130 and 131, 130' and 131', or 130" and 131" could include PtMn, IrMn, PtPdMn, NiO, NiMn, or other antiferromagnets. Selection of the antiferromagnet used in step 220 can depend upon the antiferromagnet used in the antiferromagnetic layer 106, 106', and 106". The steps of providing the antiferromagnetic layer 106, 106', or 106" and the antiferromagnetic biasing layers 130, 131, 130', 131', 130", and 131" each include annealing. Thus, the antiferromagnetic layer 106, 106', or 106" and the antiferromagnetic biasing layers 130 and 131, 130' and 131', or 130" and 131" are separately annealed. If the spin valve 111, 111', or 111" is formed first, then the antiferromagnetic biasing layers 130 and 131, 131' and 131', or 130" and 131", respectively, are annealed second. To ensure that this second anneal does not adversely affect the ability of the antiferromagnetic layer 106, 106', or 106" to function, the antiferromagnetic biasing layers 130 and 131, 130' and 131', or 130" and 131" should be annealed at a lower temperature. The annealing temperature of an antiferromagnet depends on the blocking temperature of the antiferromagnet. Therefore, the antiferromagnet used for the antiferromagnetic biasing layers 130 and 131, 130' and 131', or 130" and 131" should have a lower blocking temperature than the antiferromagnet used in antiferromagnetic layer 106, 106', or 106".

The leads 132 and 133, 132' and 133', or 132" and 133" are provided and the bi-layer photoresist structure 150 removed, via step 222. Providing the leads typically includes depositing a diffusion barrier (not separately shown), depositing a conducting layer, and depositing an additional diffusion barrier for each lead. The diffusion barriers are typically on the order of fifty to two hundred Angstroms of tantalum, while the conducting layer is on the order of three hundred to one thousand Angstroms of gold. The remainder of the MR head 100, 100', or 100" can be provided in a conventional manner.

Figure 8A:
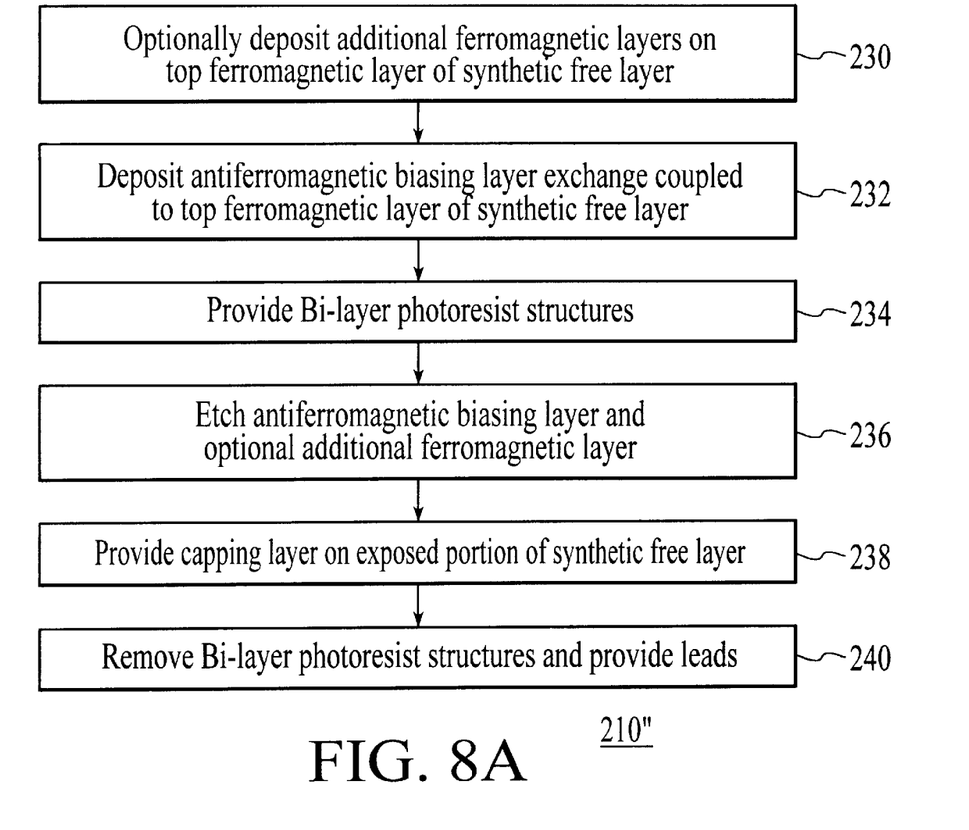
FIG. 8A is a more detailed flow chart of a second method for biasing a synthetic free layer in accordance with the present invention.

FIG. 8A depicts a more detailed flow chart of another embodiment 210" of performing step 210, providing antiferromagnetic biasing layers 130 and 131, 130' and 131', or 130" and 131" in accordance with the present invention. The method 210" preferably commences after the synthetic spin valve 111, 111', or 111" has been provided in a conventional manner. A ferromagnetic layer that will form the additional ferromagnetic layers 138 and 139 or 138" and 139" is optionally deposited, via step 230. In a preferred embodiment, the ferromagnetic layer includes between ten and thirty Angstroms of NiFe. An antiferromagnetic layer that will form the antiferromagnetic biasing layers 130 and 131, 130' and 131', or 130" and 131" is then deposited, via step 232. The antiferromagnetic layer could include PtMn, IrMn, PtPdMn, NiO, NiMn, or other antiferromagnets. The optional ferromagnetic layer and/or the antiferromagnetic layer are deposited shortly after formation of the top ferromagnetic layer 126, 126', or 126". Thus, the exchange coupling between the antiferromagnetic biasing layers 130 and 131, 130' and 131', or 130" and 131" and the top ferromagnetic layer 126, 126', or 126" is improved The exchange coupling is highly dependent upon the interface between the antiferromagnetic biasing layers 130 and 131, 130' and 131', or 130" and 131" and the top ferromagnetic layer 126, 126', or 126". Providing the antiferromagnetic biasing layers 130 and 131, 130' and 131', or 130" and 131" shortly after the top ferromagnetic layer 126, 126', or 126" improves the interface and, therefore, exchange coupling between these layers. Selection of the antiferromagnet used in step 232 can depend upon the antiferromagnet used in the antiferromagnetic layer 106, 106', and 106". For the reasons discussed with respect to FIG. 7A, the antiferromagnet used for the biasing layers 130 and 131, 130' and 131', or 130" and 131" in step 232 of FIG. 8B should have a lower blocking temperature than the antiferromagnet used in antiferromagnetic layer 106, 106', or 106".

Figure 8B:
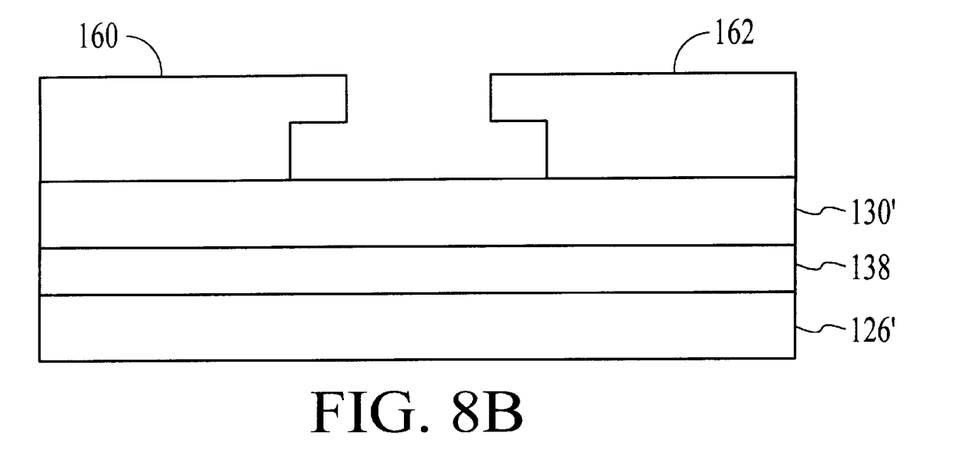
FIG. 8B depicts the magnetoresistive head during fabrication using the second embodiment of a method in accordance with the present invention.

Bi-layer photoresist structures that will be used to etch the antiferromagnetic layer and the ferromagnetic layer is then provided, via step 234. FIG. 8B depicts one embodiment of the bi-layer photoresist structures 160 and 162 deposited in step 234. The bi-layer photoresist structures 160 and 162 allow for the desired profile to be etched in the antiferromagnetic layer and the optional ferromagnetic layer. Consequently, physical track width may be controlled. Referring back to FIG. 8A, The antiferromagnetic layer and ferromagnetic layer are then etched, via step 236. In a preferred embodiment, the antiferromagnetic layer and ferromagnetic layer are etched to expose the top ferromagnetic layer 126, 126', or 126" of the synthetic free layer 120, 120', or 120". Also in a preferred embodiment, the antiferromagnetic layer and ferromagnetic layer are ion milled until the top ferromagnetic layer 126, 126', or 126" is exposed. Thus, the antiferromagnetic biasing layers antiferromagnetic biasing layers 130 and 131, 130' and 131', or 130" and 131" and additional ferromagnetic layers 138 and 139 or 138" and 139" are formed. The capping layer 128, 128' or 128" is optionally provided on the exposed portion of the top ferromagnetic layer 126, 126', or 126", via step 238. The bi-layer photoresist structures 160 and 162 are removed and the leads 132 and 133, 132' and 133', or 132" and 133" formed, via step 240. In one embodiment, formation of the leads includes masking the antiferromagnetic biasing layers 130 and 131, 130' and 131', or 130" and 131" and depositing the leads. Providing the leads typically includes depositing a diffusion barrier (not separately shown), depositing a conducting layer, and depositing an additional diffusion barrier for each lead. The diffusion barriers are typically on the order of fifty to two hundred Angstroms of tantalum, while the conducting layer is on the order of three hundred to one thousand Angstroms of gold. The remainder of the MR head 100, 100', or 100" can be provided in a conventional manner.

Figure 9:
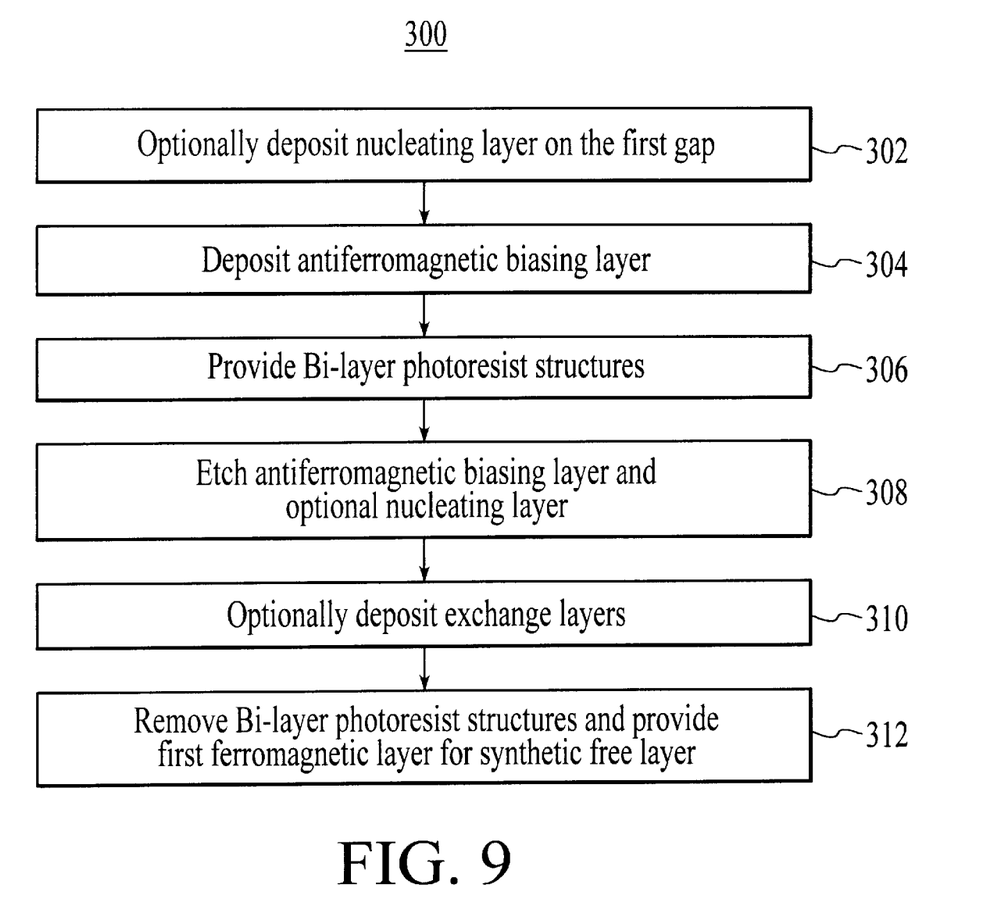
FIG. 9 is a more detailed flow chart of a third method for biasing a synthetic free layer in accordance with the present invention.
Figure 10:
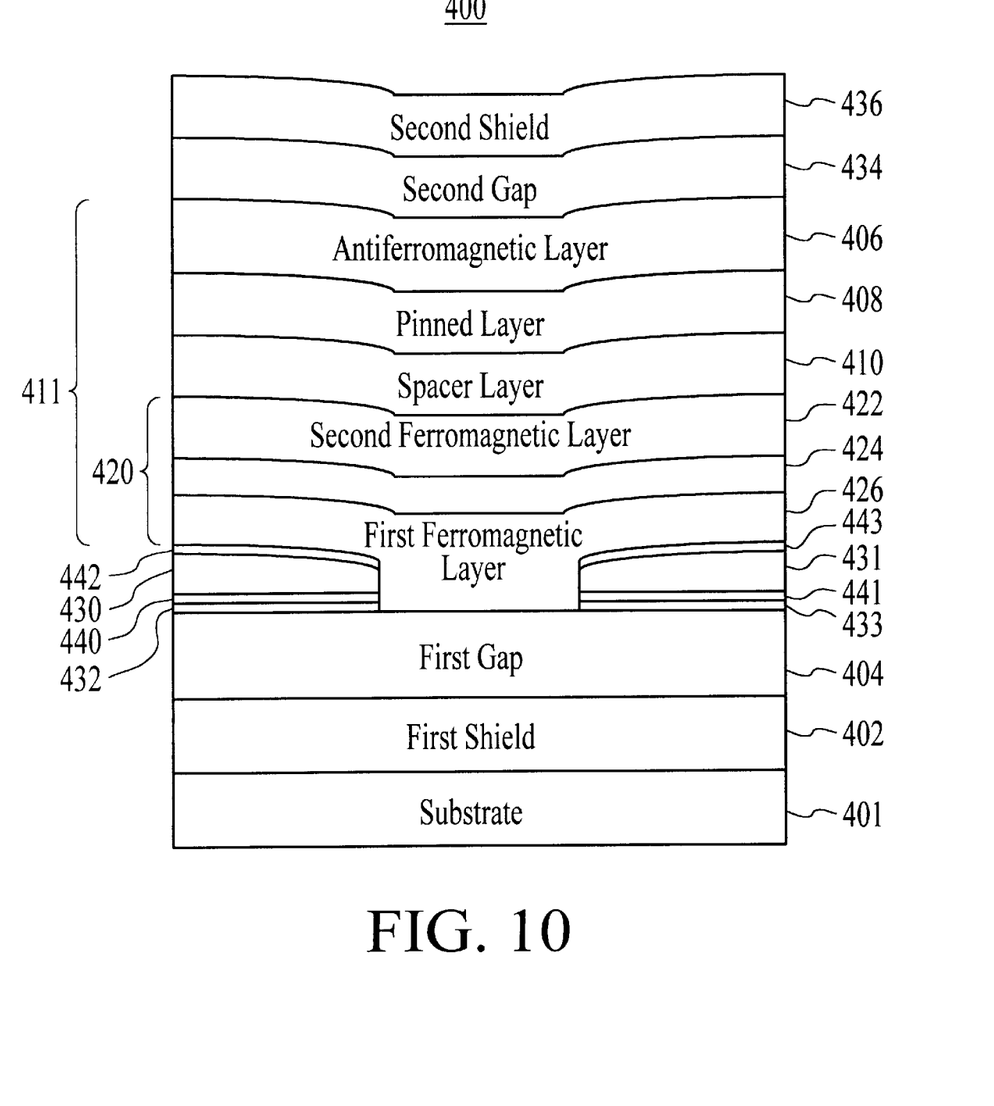
FIG. 10 is a block diagram of a fourth embodiment of a magnetoresistive head in accordance with the present invention.

FIG. 9 depicts a more detailed flow chart of another embodiment 300 of performing step 210. In the method 300, the step 210 is performed prior to the step 202. FIG. 10 depicts one embodiment of a magnetoresistive head 400 fabricated using the method 300. The magnetoresistive head 400 is analogous to magnetoresistive heads 100, 100' and 100". Consequently, similar numbers refer to similar components. For example, the antiferromagnetic biasing layers 330 and 331 are analogous to antiferromagnetic biasing layers 130 and 131, 130' and 131', or 130" and 131". Similarly, the spinvalve 411 and synthetic free layer 420 are analogous to the spin valves 111, 111', and 111" and the synthetic free layers 120, 120', and 120", respectively. The biasing antiferromagnetic layers 330 and 331 are exchange coupled to the first antiferromagnetic layer 426 of the synthetic free layer 420. The magnetoresistive head 400 also includes an optional nucleating layers 440 and 441, as well as optional exchange layers 442 and 443, discussed below. The magnetoresistive head 400 also includes leads 432 and 433. The leads 432 and 433 are preferably incorporated into the AFM biasing layers 430 and 431. The leads 432 and 433 preferably include a layer of tantalum topped with a layer of gold. These leads 432 and 433 are preferably provided prior to growth of the nucleating layers 440 and 441. However, in an alternate embodiment, the leads 432 and 433 may be provided on the antiferromagnetic layer 406.

Referring back to FIG. 9, a nucleating layer is optionally deposited on the first gap 404, via step 302. The nucleating layer may be NiFe, NiFeCr, or Ta grown to a thickness of twenty-five to fifty Angstroms. An antiferromagnetic biasing layer is deposited, via step 304. The antiferromagnetic biasing layer will become the antiferromagnetic biasing layers 331 and 331 after an etching step, discussed below. The antiferromagnetic layer could include PtMn, IrMn, PtPdMn, NiO, NiMn, or other antiferromagnets. Because the antiferromagnetic layer 406 has not yet been deposited, an antiferromagnet having a higher blocking temperature can be chosen for the antiferromagnetic layer deposited in step 304. A bi-layer photoresist structure is then provided, via step 306. In one embodiment, the bi-layer photoresist structure is substantially the same as the structure 160 and 162, depicted in FIG. 8B. An etching step is then performed, via step 308. The etching step removes the central portion of the antiferromagnetic layer and nucleating layer. Thus, the antiferromagnetic biasing layers 430 and 431 and nucleating layers 440 and 441 are formed. The exchange layers 442 and 443 may be deposited, via step 310. The exchange layers 442 and 443 are ferromagnetic layers that enhance the ability of the antiferromagnetic biasing layers 430 and 431 to couple to the first ferromagnetic layer 426 of the synthetic free layer 420. In one embodiment, the exchange layers 442 and 443 include NiFe. The exchange layers 442 and 443 also prevent oxidation on the portions of the antiferromagnetic biasing layers 430 and 431 which will become part of the interface between the first ferromagnetic layer 426 and the antiferromagnetic biasing layers 430 and 431. Thus, the exchange coupling between the first ferromagnetic layer 426 and the antiferromagnetic biasing layers 430 and 431 is facilitated. The bi-layer photoresist structure is then removed, via step 312. The first ferromagnetic layer 426 of the synthetic free layer 420 is also provided. The first ferromagnetic layer 425 is thus exchange coupled to and stabilized by the antiferromagnetic biasing layers 430 and 431. Processing of the magnetoresistive head 400 can then be continued in a conventional manner.

Using the method 200, including step 210', 210", or 300 the synthetic free layer 120, 120', or 120" can be magnetically biased. Consequently, the ferromagnetic layers 122 and 126, 122' and 126', and 122" and 126" in the synthetic free layers 120, 120', or 120" may have a single domain structure. Consequently, the MR head 100, 100', or 100" may have reduce noise during use. Furthermore, because a synthetic free layer 120, 120', or 120" is used, the magnetic moment of the synthetic free layer may be reduced without a decrease in thickness of the synthetic free layer 120, 120', or 120", respectively. Consequently, the MR head 100, 100', or 100" may be used to read higher density recording media.

A method and system has been disclosed for providing a magnetoresistive head which has reduced noise due to domain wall motion. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetoresistive head comprising: a spin valve including a synthetic free layer, the synthetic free layer including a ferromagnetic layer and a second ferromagnetic layer antiferromagnetically coupled to the ferromagnetic layer; and an antiferromagnetic biasing layer exchange coupled to a first portion of the ferromagnetic layer; wherein the antiferromagnetic biasing layer magnetically biases the synthetic free layer.

2. The magnetoresistive head of claim 1 wherein a portion of the antiferromagnetic biasing layer is above the first portion of the ferromagnetic layer.

3. The magnetoresistive head of claim 1 wherein the antiferromagnetic biasing layer further includes IrMn.

4. The magnetoresistive head of claim 1 further comprising:

a capping layer on a second portion of the ferromagnetic layer.

5. The magnetoresistive head of claim 4 wherein the capping layer is an insulating layer.

6. The magnetoresistive head of claim 5 wherein the insulating layer further includes an AlN layer.

7. The magnetoresistive head of claim 1 further comprising:

a third ferromagnetic layer disposed between the first portion of the ferromagnetic layer and the antiferromagnetic biasing layer, the third ferromagnetic layer for magnetically coupling the antiferromagnetic biasing layer to the first portion of the ferromagnetic layer.

8. The magnetoresistive head of claim 7 further including:

a first shield;

a second shield; and a gap, the gap separating either the first shield or the second shield from the spin valve and from the antiferromagnetic biasing layer.

* * * * *